8800X
J. Whitehill.
Thrashing Mach.
Patented Apr. 22, 1835.
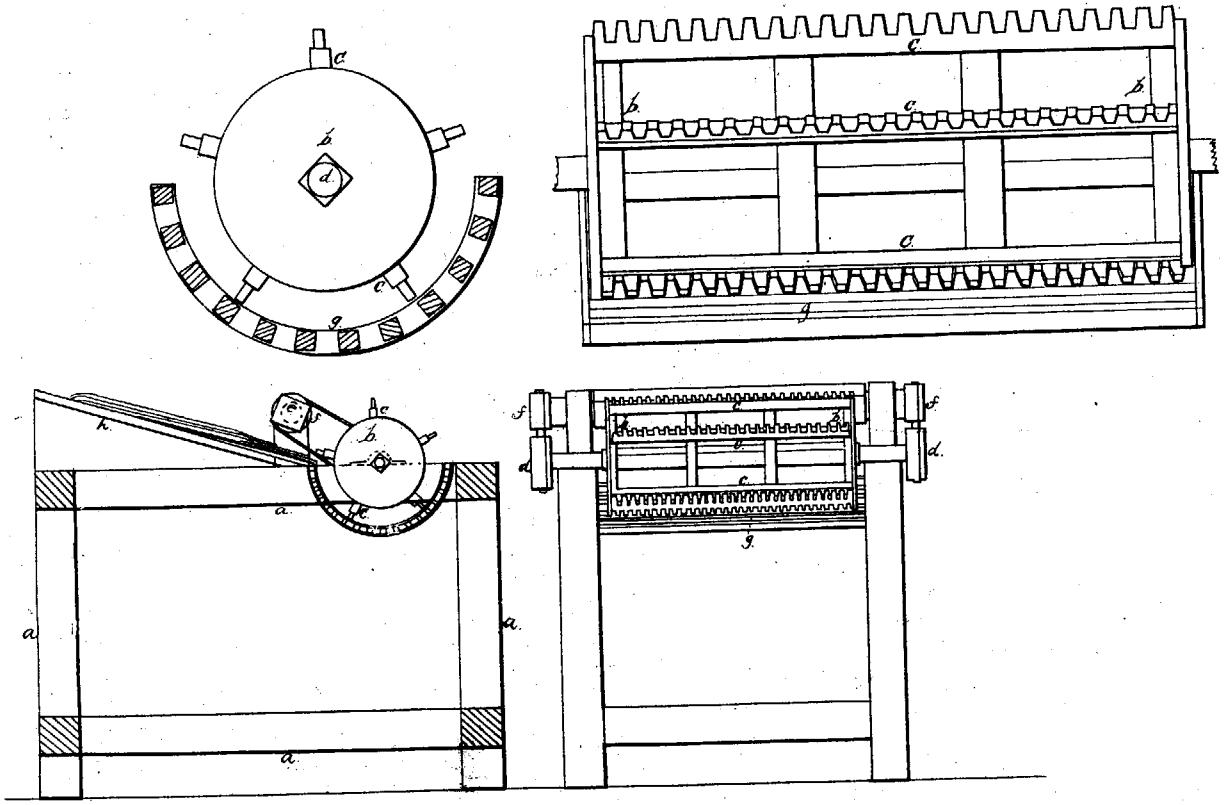

8800X Apl. 22. 1835 257

James Whitehill, of Frederick Co. Maryland.

Letters Patent.

The Schedule referred to in these Letters Patent and making part of the same, containing a description in the words of the said James Whitehill himself of his improvement in Thrashing Machines To all to whom these presents shall come. Be it known that I. James Whitehill of Frederick County and State of Maryland, have invented a new and useful improvement in Thrashing Machines. and that the following is a full and exact description thereof. The frame is composed of fourteen pieces of timber. The sides are formed of top and bottom sills, with braces directly underneath the top sills, and two legs with four cross rails & bolted together with three wrought iron bars; timbers six inches square length of frame five feet, heighth of frame three feet, six inches, width, three feet eight inches from out to out.

The cylinder two feet eight inches long sixteen inches in diameter with wrought iron axles two inches square neatly turned off where it enters the boxes. The cylinders may be varied in size upon the axle is placed four cast iron heads two inches thick and eleven & a half inches in diameter, with square holes in their centres to fix on axle, with five holes cut one and a half inches from the surface of the heads and through which are drilled five holes, through which go half inch bolts, to hold the beaters on; Teeth and beaters are formed of a bar of wrought iron, two inches by one inch and an eighth, teeth to be cut edgewise on the bar, one inch and a quarter long drawing them a little to a point. teeth to be half inch at surface, and five eighths at base vacancies between teeth same size, and five eighths at base, precisely only reversed, which makes the tooth beater, leaving behind the tooth, one inch of solid wrought iron, the beaters to Drawing Made

8800X to be placed on the surface of the cast iron heads, with
holes drilled through them to corespond with the four heads
at the end of the cylinder, and over the five tooth beaters
to be placed a hoop of iron, one inch by three quarters to
confine, down at each end, and directly opposite the tooth
beaters, through the hoop and beaters holes are drilled & through
the holes a bolt or screws confine the hoop and beaters together.
The boxes on which the axles of the cylinder run, made of one
piece of cast iron bedded into the frame and at each end, a half
inch hole drilled in that; that is placed - a metallic box formed
of two pieces, running into the cast iron box, dovetailed,
over them is placed a piece of wrought iron with holes at each
end, through which go bolts down into the frame, and confines
boxes and cylinder axles firmly. a pulley to be placed on the axle
for the main strap seven inches in diameter. The feeding roller
to be placed on two upright posts, roller to be three inches from
the surface of the cylinder, and four inches from the surface
of the feeding board. The roller to be four inches square, and two
feet eight inches long to be made of wrought iron, with a pulley
on the end opposite the main pulley. The concave is formed
of twelve square bars, an inch and an eighth square, to fit
the cylinder, at each side of the machine is placed two quarter
circles cast iron plates, sixteen inches and a half in diameter,
through which pass the wrought iron bars which forms the
concave well bolted to the sides. The concave is placed
from the end of the frame, the top of the machine is covered
with a square box and the feeding board is constructed in
the usual way.

What I claim as my own invention, and not previous-
ly known in the above described Machine, is as follows.

The cylinder two feet eight inches long, sixteen inches in dia-
meter with a wrought iron axle two inches square neatly
turned off where it rests on the boxes, upon the axle is pla-
ced placed, four cast iron heads, two inches thick, and eleven
and a half inches in diameter, with square holes in their
centres to fix on the axle, with five holes cut one and a half
inches, from the surface of the heads, and through which are
drilled five holes, through which go half inch bolts to hold
the ~~[illegible]~~ beaters on; Teeth and beaters are formed of a bar of wrought
iron, two inches by one inch and an eighth, teeth to be
cut edgewise on the bar one inch a quarter long drawing them
a little to a point, teeth to be half inch at surface, and five eighths
at base, vacancies between teeth same size precisely,
only reversed, which makes the tooth beater, leaving
behind the tooth one inch of solid wrought iron, the
beater to be placed on the surface of the cast iron heads
with holes drilled through them to correspond with the
four heads at the end of the cylinder, and over the five
tooth beaters, to be placed a hoop of iron one inch by
three quarters of an inch to confine the tooth beaters down
at each end, and directly opposite the tooth beaters; through
the hoop and beaters, holes are drilled, and through the
holes a bolt to confine the hoop and beaters together at
each end - a pulley on the axle for main strap seven inches
in diameter. Feeding roller 4 inches square and 2 feet 5 inches
long of a wrought iron, with a pulley on the end opposite
the main pulley to be placed on upright posts, three inches
from surface of the cylinder, and four inches from the
surface of the feeding board. This machine operates upon
the united principle of tooth and beater, and unites greater
power; with requiring less force to propel it. It differs
from all other Machines now in use, in not having teeth
in the concave and has but one feeding roller; that may
be dispensed with if necessary; and it further differs
from other Machines in the small number and pecu-
liar formation of the teeth which gives not only
an

8800X an increase of power but also threshes grain without use of the feeding roller, if dry.

Witnesses

Wm. S. Ross — James Whitehill

George Rice

Exd.

W.H.

[1176 n.